(12) United States Patent
Danner et al.

(10) Patent No.: US 12,741,438 B2
(45) Date of Patent: Sep. 22, 2026

(54) METHOD TO INCREASE EXTRACTION CAPACITY, POWER, AND EFFICIENCY IN A JUICE EXTRACTION MACHINE

(71) Applicant: JBT Marel Corporation, Chicago, IL (US)

(72) Inventors: David Danner, Tampa, FL (US); Brandon Coles, Temple Terrace, FL (US); Michael Mas, Lakeland, FL (US); Philip G. Hebbler, Winter Haven, FL (US)

(73) Assignee: JBT Marel Corporation, Chicago, IL (US)

(*) Notice: Subject to any disclaimer, the term of this patent is extended or adjusted under 35 U.S.C. 154(b) by 59 days.

(21) Appl. No.: 18/890,560

(22) Filed: Sep. 19, 2024

(65) Prior Publication Data

US 2025/0010566 A1 Jan. 9, 2025

Related U.S. Application Data

(63) Continuation of application No. 16/520,060, filed on Jul. 23, 2019, now Pat. No. 12,122,115.

(51) Int. Cl.

| | |
|---|---|
| ***B30B 15/14*** | (2006.01) |
| ***A23N 1/00*** | (2006.01) |
| ***A23N 1/02*** | (2006.01) |
| ***A47J 19/02*** | (2006.01) |
| ***B30B 9/04*** | (2006.01) |

(Continued)

(52) U.S. Cl.

CPC ............ *B30B 15/148* (2013.01); *A23N 1/003* (2013.01); *A23N 1/02* (2013.01); *A47J 19/023* (2018.08); *B30B 9/04* (2013.01); *B30B 15/0094* (2013.01); *B30B 15/26* (2013.01); *A23V 2002/00* (2013.01); *A23V 2300/14* (2013.01)

(58) Field of Classification Search

CPC ....... B30B 15/148; A47J 19/023; A23N 1/003

See application file for complete search history.

(56) References Cited

U.S. PATENT DOCUMENTS

| | | | | |
|---|---|---|---|---|
| 3,780,863 A * | 12/1973 | Light | B01D 35/18 | 210/387 |
| 4,363,263 A * | 12/1982 | Williams | A47J 37/045 | 134/108 |

(Continued)

FOREIGN PATENT DOCUMENTS

| | | |
|---|---|---|
| CN | 102005091 A | 4/2011 |
| CN | 104146582 A | 11/2014 |
| CN | 104207621 A | 12/2014 |

OTHER PUBLICATIONS

Office Action mailed Nov. 11, 2022, issued in Mexican Patent Application No. MX/a/2019/008809, filed Jul. 24, 2019, 14 pages.

(Continued)

*Primary Examiner* — Sean M Michalski

(74) *Attorney, Agent, or Firm* — Christensen O'Connor Johnson Kindness PLLC

(57) ABSTRACT

A juicing machine comprises: an electric motor; a variable frequency drive configured to control the speed of the electric motor; a juicing mechanism that has at least one extraction assembly that operates cyclically to extract juice; and at least one sensor that determines the position or positions of the extraction assembly during a cycle.

13 Claims, 9 Drawing Sheets

(51) Int. Cl.
*B30B 15/00* (2006.01)
*B30B 15/26* (2006.01)

(56) References Cited

U.S. PATENT DOCUMENTS

| | | | | |
|---|---|---|---|---|
| 4,705,055 | A * | 11/1987 | Rohm | B07B 1/55 210/143 |
| 4,905,586 | A * | 3/1990 | Anderson | A23N 1/003 100/98 R |
| 4,922,814 | A * | 5/1990 | Anderson | A23N 1/003 100/98 R |
| 5,076,156 | A * | 12/1991 | Ohike | B02B 3/04 99/611 |
| 5,924,972 | A * | 7/1999 | Turvaville | B04B 5/0414 494/12 |
| 6,095,677 | A * | 8/2000 | Karkos, Jr | A23G 9/224 366/314 |
| 10,022,614 | B1 * | 7/2018 | Tran | G16H 50/20 |
| 10,399,050 | B1 * | 9/2019 | Bertsch | A47J 43/042 |
| 10,966,439 | B2 * | 4/2021 | Lam Nguyen | A23L 2/04 |
| 2001/0002892 | A1 * | 6/2001 | Karkos, Jr. | A23G 9/045 366/314 |
| 2002/0166465 | A1 * | 11/2002 | Schrader | A23N 1/003 100/98 R |
| 2004/0069162 | A1 * | 4/2004 | Lokhandwala | A23N 1/003 100/104 |
| 2014/0379150 | A1 * | 12/2014 | Guo | G06F 1/26 700/286 |
| 2016/0056828 | A1 * | 2/2016 | Ueki | H03M 1/12 341/155 |
| 2016/0095461 | A1 * | 4/2016 | Desjardin | A23N 1/02 99/513 |
| 2017/0188600 | A1 * | 7/2017 | Semo Scharfman | A23G 9/228 |
| 2017/0251863 | A1 * | 9/2017 | Murphy | B30B 9/04 |
| 2017/0287721 | A1 * | 10/2017 | Wood | H10P 50/613 |
| 2018/0015515 | A1 * | 1/2018 | Sivakumar | B03B 9/06 |
| 2018/0020714 | A1 * | 1/2018 | Waters | A23N 1/003 99/496 |
| 2018/0145623 | A1 * | 5/2018 | Xiang | H02P 29/60 |
| 2018/0199613 | A1 * | 7/2018 | Vougioukas | A23N 15/04 |
| 2018/0271041 | A1 * | 9/2018 | Lovas | A01G 31/02 |
| 2020/0367532 | A1 * | 11/2020 | Nguyen | A23L 2/60 |
| 2021/0013785 | A1 * | 1/2021 | Liang | H02K 1/146 |

OTHER PUBLICATIONS

Second Office Action mailed Mar. 17, 2023, issued in Mexican Patent Application No. MX/a/2019/008809, filed Jul. 24, 2019, 14 pages.

Third Office Action mailed Oct. 11, 2023, issued in Mexican Patent Application No. MX/a/2019/008809, filed Jul. 24, 2019, 17 pages.

* cited by examiner

METHOD TO INCREASE EXTRACTION CAPACITY, POWER, AND EFFICIENCY IN A JUICE EXTRACTION MACHINE

CROSS-REFERENCE TO RELATED APPLICATION

This application is a continuation of U.S. patent application Ser. No. 16/520,060, filed Jul. 23, 2019, the entire contents of which are incorporated herein by reference.

BACKGROUND

Prior art juicing machines for instantaneous delivery of juice to a consumer, such as are found at restaurants and grocery stores, use a single-phase motor. Constant speed, constant power motors can stall when attempting to extract juice from oversized or overly hard fruit. In many cases, this type of fruit is preferred because of lower cost.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One problem with single-phase motors is that they are limited in the total power that can be transmitted to the extraction assembly from standard consumer electrical sockets and are typically much less electrically efficient than 3-phase motors. This disclosure relates to juicing machines, for example, that are used in restaurants, grocery stores and the like that accept single-phase power supply by plugging into standard consumer electrical sockets as may be found in such places. This disclosure relates to the use of a 3-phase motor and variable frequency drive in a juicing machine that connects to a single-phase electrical supply. Therefore, the juicing machine does not require 3-phase industrial electrical connections.

In one embodiment, this disclosure improves the capacity and efficiency of juicing machines by;

1) Increasing the capacity (rpm) of fruit or vegetables on a per minute basis;
2) Increasing the available squeezing torque to enable the machine to extract juice from large, hard fruit, and
3) Reducing the electrical current draw of the machine by improving electrical efficiency.

This disclosure provides a juicing machine with variable frequency drive (VFD) to convert single-phase electrical current to 3-phase electrical current thereby increasing torque and efficiency.

The capacity increase is achieved by significantly increasing the speed to the motor using features of the VFD during the portion of the juicing cycle that doesn't require high torque and slowing down the cycle (increasing torque) for the portion of the juicing cycle that requires high torque (i.e. squeezing the fruit).

The juicing machine includes a reciprocating upper cup that compresses the fruit or vegetable within a lower cup. Upon compression, the juice is separated from the pulp through the use of a strainer tube. The juice is collected into a reservoir for dispensing.

The juicing mechanism is driven by a motor connected to a mechanical gear and chain reduction system designed to reduce the extraction cycle velocity from the normal motor rotation velocity down to a velocity suitable for the extraction of fruits and vegetables, typically from 1500/1750 rpm down to 18/20 rpm. According to the disclosure the previous standard 1 HP 120V/220V single-phase, constant speed can be replaced with a 1.5 HP 3 phase motor. It is possible to use a 3-phase motor with single phase supply by using a VFD capable of converting single-phase to 3-phase.

Use of such a VFD enables certain capabilities:

1) Changing the constant rotational velocity of the motor up to twice the speed normally available on constant-frequency electrical supplies;
2) Allows intermittent changes in velocity during a single extraction cycle of the machine;
3) Increases the power rating of the motor while maintaining the same footprint for installation of the motor within the machine; and
4) Increases the power efficiency over the single-phase motor with the effect of reducing the current draw required for the extraction cycle.

In one embodiment, a juicing machine comprises an electric motor; a variable frequency drive configured to control the speed of the electric motor; a juicing mechanism that has at least one extraction assembly that operates cyclically to extract juice; and at least one sensor that determines the position or positions of the extraction assembly during a cycle.

In one embodiment, the at least one sensor senses a start of a period of the cycle requiring greater torque to decrease motor speed.

In one embodiment, the at least one sensor determines a start of a juicing cycle, and one or timers count a time (x) from the start of the juicing cycle to a start of a period requiring greater torque, and the one or more timers count a time (y) to an end of the period requiring greater torque.

In one embodiment, the juicing machine comprises a controller that sends a signal to reduce a motor speed from the start of the period requiring greater torque to the end of the period requiring greater torque.

In one embodiment, the juicing machine extracts juice from one item at a time during one cycle of the extraction assembly.

In one embodiment, a difference between time (x) and time (y) from the start of the period requiring greater torque to the end of the period requiring greater torque is a period when the extraction cup is compressing a fruit or vegetable item.

In one embodiment, the juicing machine comprises a rotary to linear motion converter that reciprocates the extraction assembly up and down in one cycle.

In one embodiment, the one or more timers start counting when an extraction cup is at an approximated top dead center.

In one embodiment, the juicing machine is configured to be powered from a single phase electrical supply.

In one embodiment, the juicing machine comprises a user interface for inputting values of the time (x) and the time (y).

In one embodiment, the juicing mechanism comprises a first extraction cup that reciprocates up and down and a second stationary extraction cup, wherein the first extraction cup comprises a plurality of discrete fingers arranged in a ring and the second cup comprises plurality of discrete fingers arranged in a ring, wherein the fingers of the first cup intermesh with the fingers of the second cup.

In one embodiment, the juicing machine comprises one timer that counts time (x) and time (y).

In one embodiment, the electric motor is a 3-phase electric motor.

In one embodiment, a method of extracting juice from a fruit or vegetable item, comprises sensing a start of a juicing cycle of a juicing machine; counting a first time (x) from the start of the juicing cycle to a start of a period of the juicing cycle requiring greater torque; when the time (x) has been counted to the start of the period requiring greater torque; reducing speed of an electric motor with a variable frequency drive; counting a second time (y) to an end of the period requiring greater torque; when the second time (y) has been counted to the end of the period requiring greater torque, increasing the speed of the electric motor with the variable frequency drive.

In one embodiment, counting the second time (y) comprises counting from the start of the juicing cycle to the end of the period requiring greater torque.

In one embodiment, counting the second time (y) comprises starting counting from the time (x) has been counted to the end of the period requiring greater torque.

In one embodiment, the method comprises collecting juice of a fruit or vegetable item and discarding the inedible portions.

In one embodiment, the method comprises, after increasing the speed of the motor, sensing a start of a new juicing cycle of the juicing machine with a new fruit or vegetable item.

In one embodiment, the juicing machine extracts juice from one fruit or vegetable item at a time during one cycle of a juicing mechanism.

In one embodiment, a difference between time (x) and time (y) from the start of the period requiring greater torque to the end of the period requiring greater torque is a period when the extraction assembly is compressing a fruit or vegetable item.

In one embodiment, the juicing mechanism comprises a rotary to linear motion converter that reciprocates an extraction cup up and down in one cycle.

In one embodiment, one or more timers start counting when an extraction cup is at an approximated top dead center.

In one embodiment, the method comprises providing the juicing machine with a single phase electrical supply.

In one embodiment, the method comprises extracting juice with a first extraction cup that reciprocates up and down and a second stationary extraction cup, wherein the first extraction cup comprises a plurality of discrete fingers arranged in a ring and the second cup comprises plurality of discrete fingers arranged in a ring, wherein the fingers of the first cup intermesh with the fingers of the second cup.

In one embodiment, the method comprises loading a fruit or vegetable item in the second cup, which is stationary and below the first extraction cup.

In one embodiment, the method comprises pre-determining values of the time (x) and the time (y) prior to start of the juicing cycle and inputting the values.

In one embodiment, a method of making a juicing machine comprises replacing a single-phase motor with a 3-phase motor and variable frequency drive.

In one embodiment, the method of making further comprises adding one or more timers that count a time (x) from the start of the juicing cycle to a start of a period requiring greater torque, and the one or more timers count a time (y) to an end of the period requiring greater torque.

In one embodiment, a method of extracting juice from a fruit or vegetable item, comprises, when sensing a start of a period requiring greater torque for an extraction assembly of a juicing machine, reducing speed of an electric motor with a variable frequency drive; and when sensing the end of the period requiring greater torque for the extraction assembly, increasing the speed of the electric motor with the variable frequency drive.

In one embodiment, the sensing of the start and end of the period requiring greater torque for the extraction assembly of the juicing machine is sensed by at least a first and second sensor placed in proximity to the path taken by the extraction assembly, wherein the first and second sensor are spaced from each other along the path.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
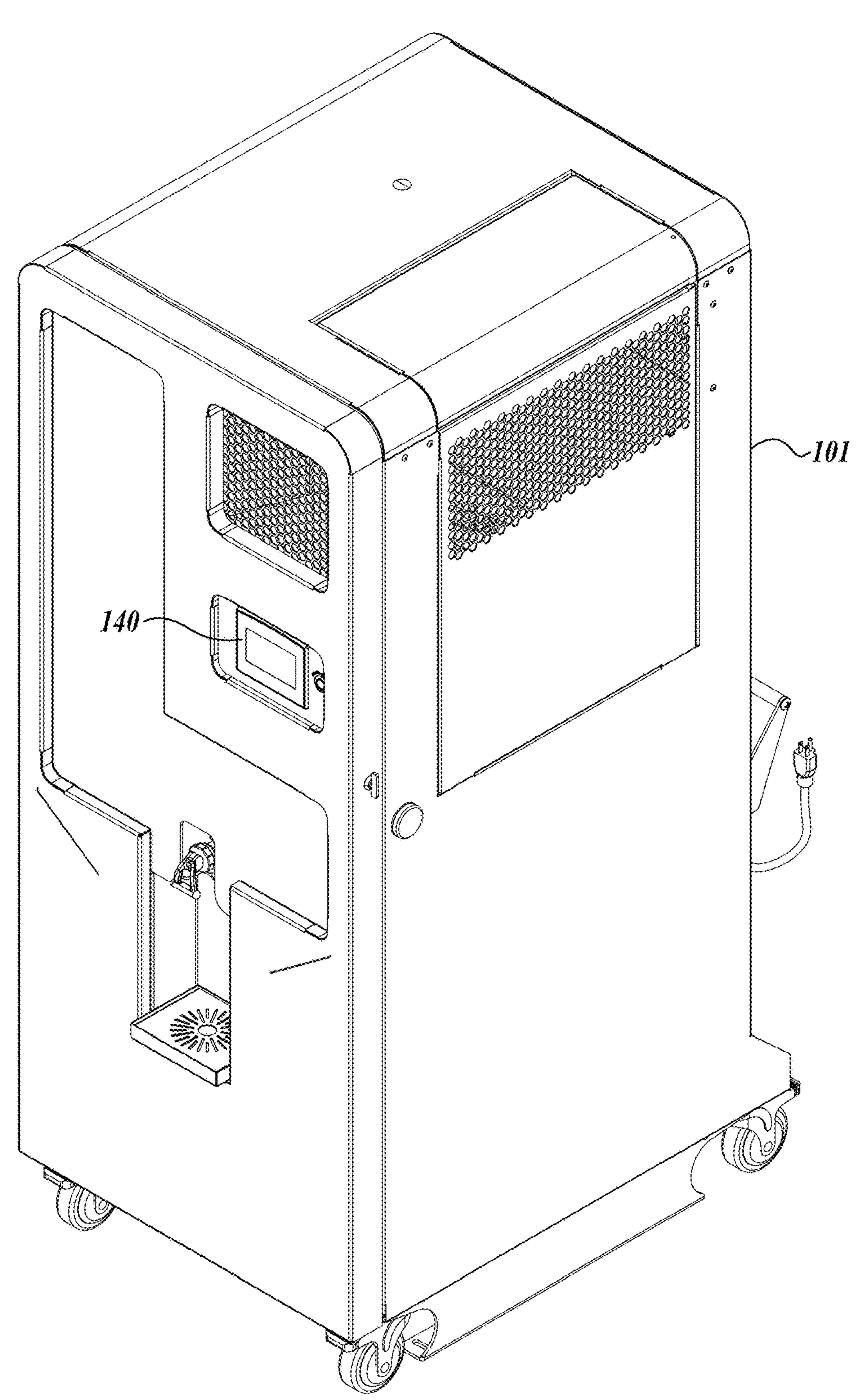
FIG. 1 is a diagrammatical illustration of a juicing machine.

Referring to FIG. 1, a reciprocating juicing machine 101 designed to extract the juice from various types of fruits or vegetables is illustrated.

Figure 2A:
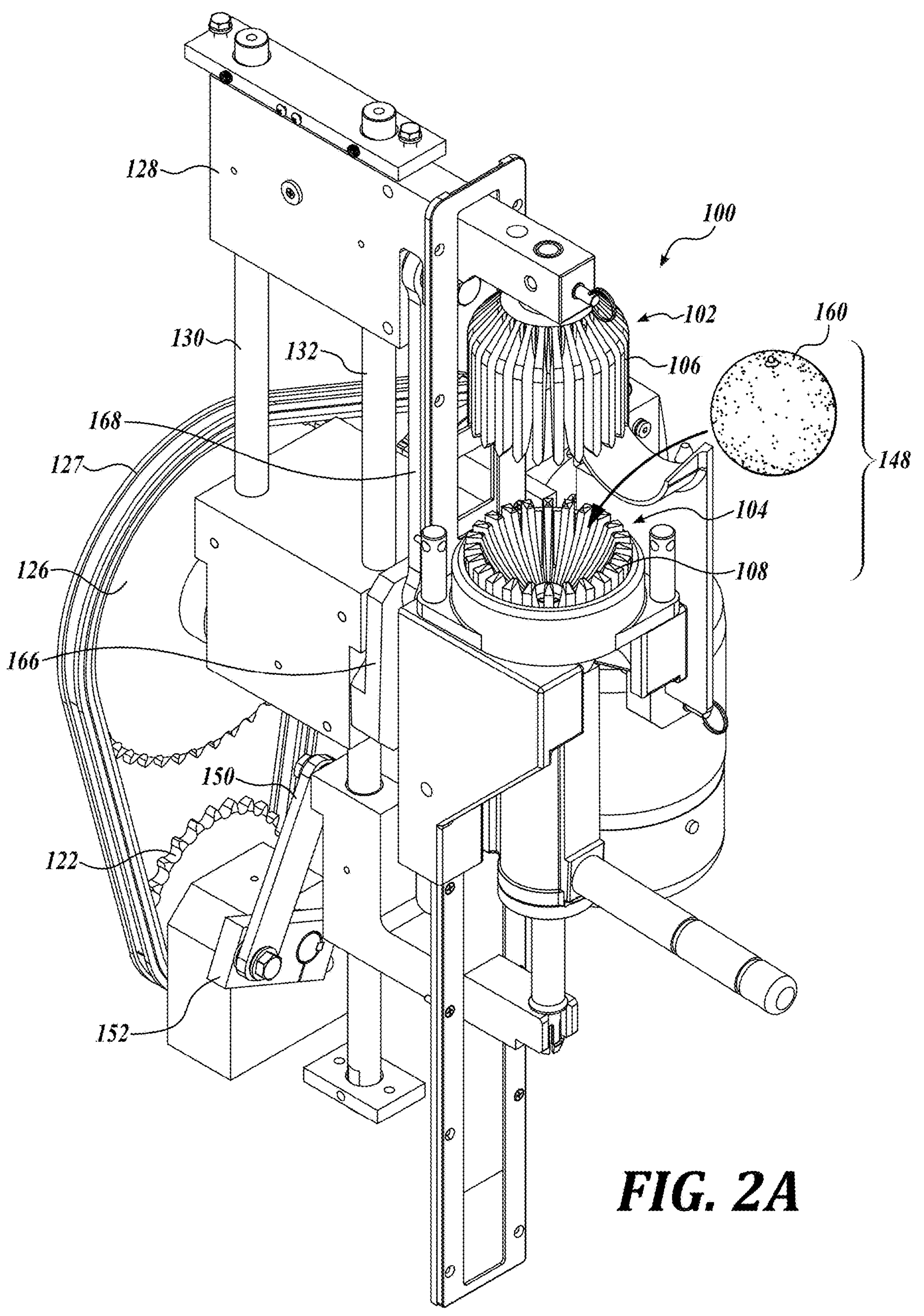
FIG. 2A is a diagrammatical illustration of a juicing mechanism of the juicing machine of FIG. 1 with the upper extraction cup at top dead center.
Figure 2B:
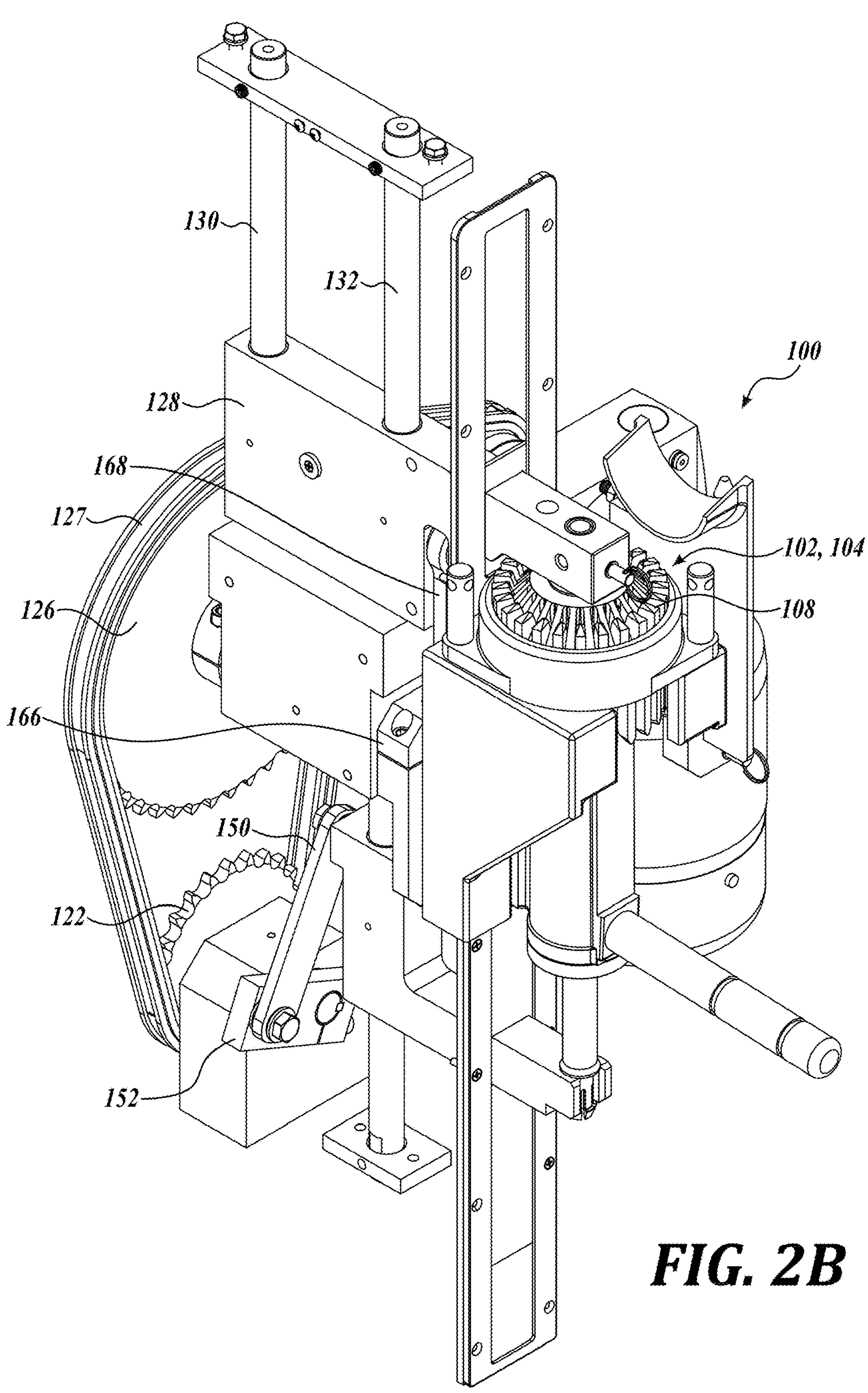
FIG. 2B is a diagrammatical illustration of a juicing mechanism of the juicing machine of FIG. 1 with the upper extraction cup bottomed out.

Referring to FIG. 2, a juicing mechanism 100 of an electrically powered juicing machine is illustrated. The juicing mechanism 100 is enclosed with the juicing machine 101. Other subsystems of the juicing machine 101 are not illustrated. Even further, the juicing mechanism 100 includes an extraction assembly 148 for extracting the juice from a fruit or vegetable item 160. In one embodiment, the extraction assembly 148 includes a first 102 and second 104 extraction cups. The juicing mechanism 100 and the juicing machine 101 operate by compressing any fruit or vegetable item 160 between the first upper extraction cup 102 and the second lower extraction cup 104. At least one of the first 102 or the second 104 extraction cup reciprocates, in this case, the first upper extraction cup 102 reciprocates up and down, and in the process compresses the fruit or vegetable within the stationary second extraction cup 104. In one embodiment, the extraction assembly 148 uses a linear force for compression. However, other extraction assemblies 148 contemplated in this disclosure can use angular force or non-linear force.

The first extraction cup 102 has a plurality of discrete fingers 106 arranged in a ring, wherein each of the fingers 106 is attached at a common center at the top of the first extraction cup 102. The fingers 106 are equally spaced from one another thereby leaving spaces between any two juxtaposed fingers 106. The fingers 106 are only positioned on the periphery and do not extend to the axial center of the first extraction cup 102, thereby forming an interior space representing an upside cup.

The second extraction cup 104 has a plurality of discrete fingers 108 arranged in a ring, wherein each of the fingers 108 is attached at a common base at the bottom of the second extraction cup 104. The fingers 108 are equally spaced from one another thereby leaving spaces between any two juxtaposed fingers 108. The fingers 108 are only positioned on the periphery and do not extend to the axial center of the second extraction cup 104, thereby forming an interior space representing a cup.

The axial centers of the first 102 and second 104 extraction cups are collinear. However, the fingers 106 of the first extraction cup 102 intermesh with the fingers 108 of the second extraction cup 104. That is the fingers 106 of the first extraction cup 102 pass through the spaces between the fingers 108 of the second extraction cup 104, and vice versa. The fit between fingers 106, 108 is close, but, there is no requirement that the fingers 106, 108 should form a seal. When the cups 102, 104 compress a fruit or vegetable item 160, the juice and pulp are channeled through the center of cup 104 into a strainer tube. Below the second extraction cup 104, the strainer tube separates the inedible fibers from the juice. From the strainer tube, the juice is sent to the container or to the spigot. The inedible fibers are pushed out via a plunger and disposed or recycled, as compost for example. Some pulp can travel with the juice through the strainer tube, and inedible fibers like peel pieces, core and seeds are rejected by the strainer tube.

The extraction assembly 148, and more specifically the extraction cup 102, operates cyclically compressing one fruit or vegetable item 160 per juicing cycle. However, the use of extraction assemblies including multiple cups or compressing multiple items 160 within one cup is also contemplated as being within the scope of this disclosure. In one embodiment, a juicing cycle includes one reciprocation of upper extraction cup 102 up and down. Cyclical operation of the upper extraction cup 102 implies the up and down motion is repeated. Each cycle can be defined by an arbitrary starting point. A common starting point for the juicing cycle is when the first upper extraction cup 102 reaches the maximum height, known as top dead center (TDC). However, as a reference to define the start and end of one juicing cycle, any other point in the juicing cycle can be selected. The use of TDC as defining the juicing cycle is arbitrary but is a convenient starting point. Furthermore, because of the inherent limitations of sensors, the TDC as defined herein can mean the initial detection of TDC by a sensor or the loss of detection by a sensor. The acquisition or loss of a signal by a sensor can trigger the start of a timer signifying the start of the juicing cycle. Therefore, TDC can be any point in the period from the time the sensor acquires the signal of TDC to the loss of the signal of TDC.

Immediately before or immediately after the TDC, a loading mechanism (not shown) loads a single unjuiced, noncompressed fruit or vegetable item 160 into the lower extraction cup 104. The upper extraction cup 102 next starts the downward moving part of the cycle. In the downward part of the juicing cycle, the juice and core from the fruit or vegetable item 160 are pressed into the strainer tube as a whole where the juice is then separated. The upper extraction cup 102 is mechanically set to bottom at a certain depth, and then, begin its upward motion to again repeat the cycle upon reaching TDC.

Figure 3:
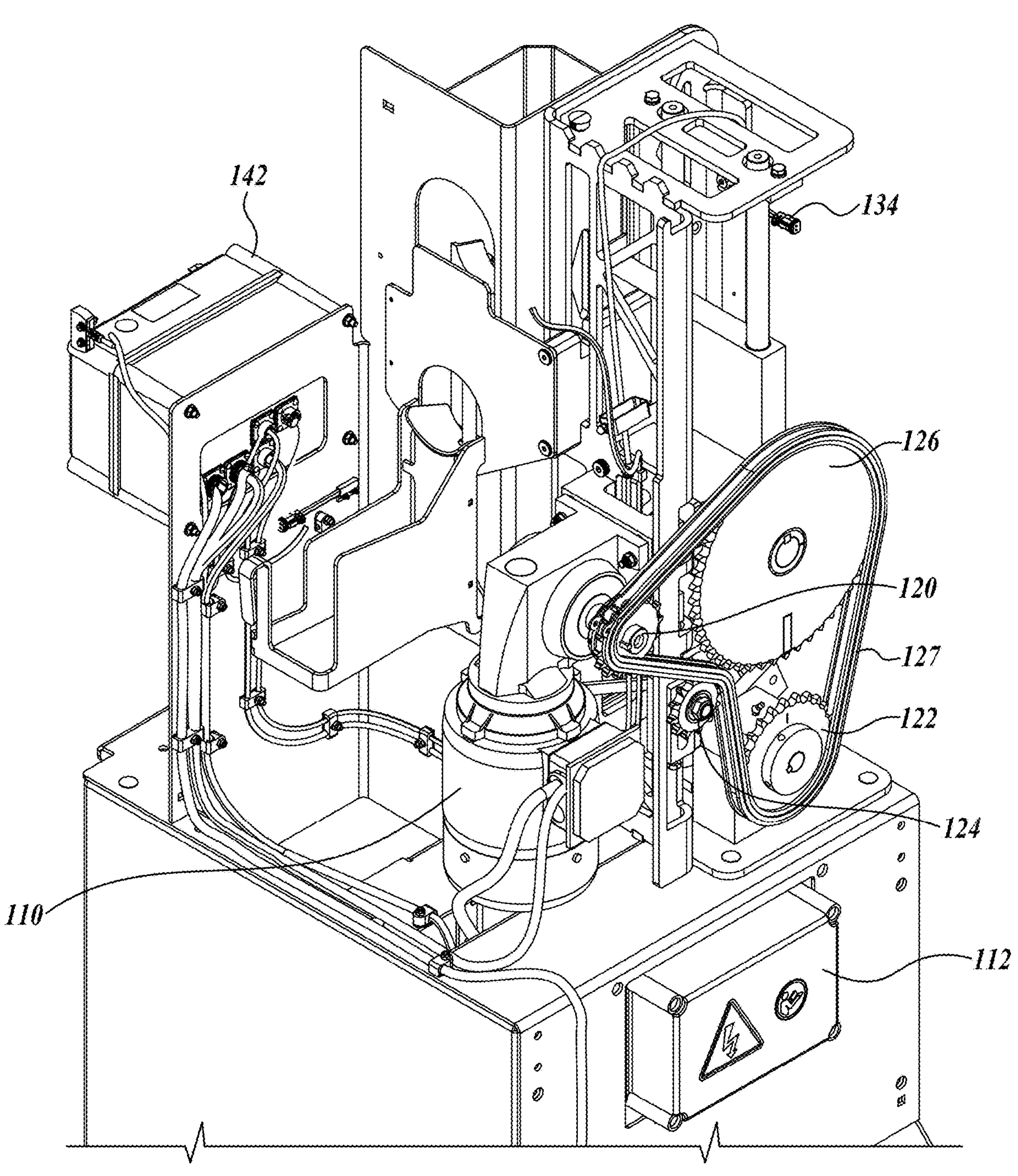
FIG. 3 is a diagrammatical illustration of a motor and juicing mechanism of the juicing machine of FIG. 1.
Figure 4:
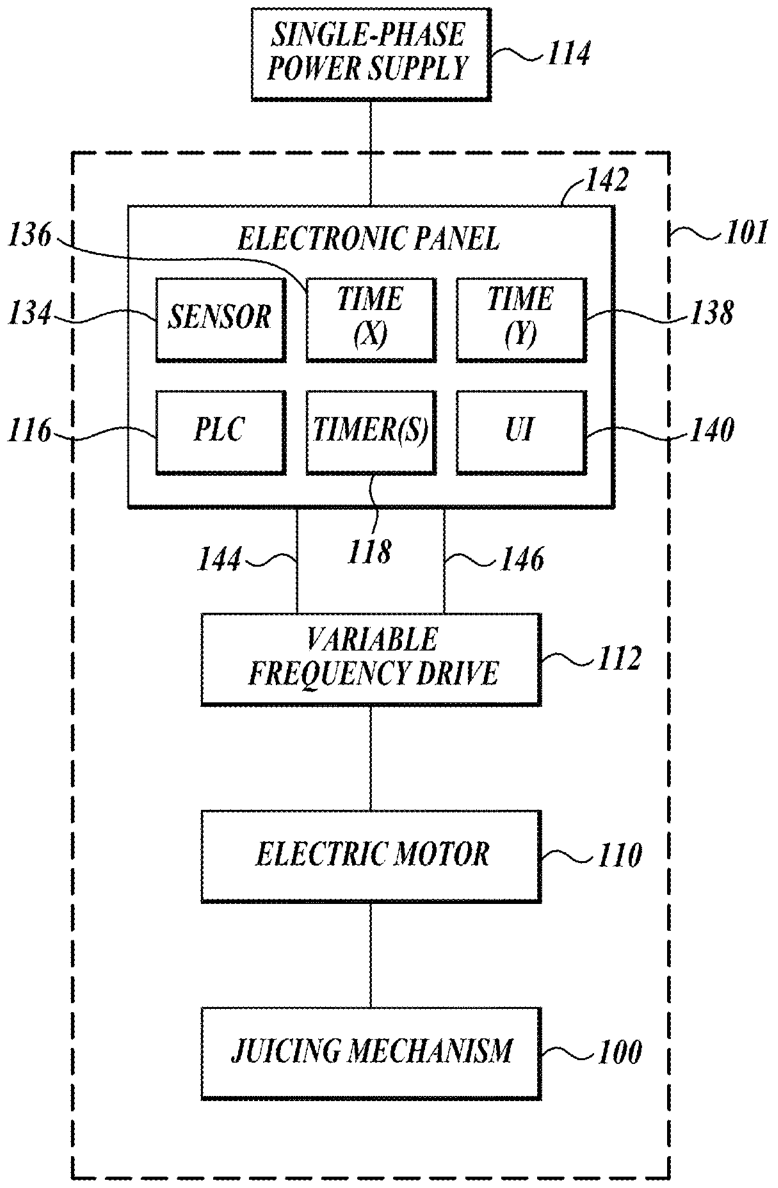
FIG. 4 is a schematic illustration of the juicing machine of FIG. 1.

Referring to FIGS. 3 and 4, the reciprocation mechanism for the upper extraction cup 102, the drive system, and control components are illustrated.

An electric driver motor 110 is used to drive the reciprocating upper extraction cup 102. In one embodiment, the motor 110 is a 3-phase motor connected to a variable frequency drive 112. However, the juicing mechanism 100 is not limited to a 3-phase motor. Therefore, in one embodiment, the motor 110 is a single-phase motor connected to the variable frequency drive 112. The variable frequency drive 112 in turn is connected to the electrical panel 142. The electrical panel 142 provides power and control signals via power cable 144 and communication cable 146 to the variable frequency drive 112. In one embodiment, the electrical supply 114 to the juicing machine 101 and therefore to the variable frequency drive 112 can be a single-phase electrical supply. The VFD 112 is used to convert the single-phase electrical supply 114 to the a 3-phase supply used by the motor 110 when the motor 110 is selected to be a 3-phase motor. Furthermore, the electrical panel 142 is used to calculate times when the VFD 112 is used to control the speed and therefore, the torque of the motor 110 during portions of the juicing cycle to improve efficiency.

The variable frequency drive 112 is a motor controller that controls the electric motor 110 by varying the frequency, current, or voltage or a combination supplied to the electric 3-phase motor 110. In one embodiment, the variable frequency drive 112 is provided with frequency, current, and voltage sensors that it uses to control the frequency, current, and voltage to the 3-phase motor 110. The frequency, current, and voltage changes can be pre-determined by the use of the specific motor 110 operating curves describing the relationships between frequency, current, power, voltage, speed, and torque. In one embodiment, the variable frequency drive 112 controls the electric motor 110 by varying the frequency supplied to the electric 3-phase motor 110. The frequency changes can be pre-determined by the use of the specific motor 110 operating curves describing the relationships between frequency, current, power, voltage, speed, and torque.

In one embodiment, the electronic panel 142 is provided with a programmable logic controller 116 and user interface 140. The programmable logic controller 116 communicates with user interface 140 that allows a user or operator to input the operating frequencies, voltages, or timers for operating during the periods of the juicing cycle. The electronic panel 142 is provided with a timer circuit 118 that can measure the elapsed time of certain events and compare the elapsed time to pre-determined timing setpoints. The timer circuit 118 can include a single timer or clock that continually counts elapsed time, or the timer circuit 118 can include one or more timer circuits, each timer circuit can independently count an elapsed time and can also have the same or different starting and ending points. For example, a single timer counts a total elapsed time and compares the time to pre-determined timed setpoints, or multiple timers can be used to count the elapsed time wherein each timer is used to count the elapsed time of a single timed setpoint. Furthermore, any one or more of the timers 118 can be zeroed based on a timing event, such as at the start of each juicing cycle.

The electronic panel 142 is provided with one or more time storage circuits 136, 138, which accept a pre-determined time limit to use as the setpoints to carry out certain timed instructions during the juicing cycle. A stationary proximity sensor 134, which can be an inductance sensor, is mounted above and in in proximity to the cup beam 128 when the cup beam 128 reaches TDC (the approximated TDC). The proximity sensor 134 communicates with the electronic panel 142, and is used to determine the start of a juicing cycle and the one or more timer(s) 118. It should be understood that the sensor 134 may not provide a true TDC, and can provide an approximated TDC, because the sensor 134 can acquire a signal immediately before or immediately after true TDC. As used herein, TDC is an approximated TDC which can start at the first instance of detection by the proximity sensor 134 or upon the loss of the signal of the proximity sensor 134.

The motor 110 shaft is connected to a first drive sprocket 120 which in turn powers the drive chain 127 that is looped over second 122 and third 126 sprockets. A chain tensioner 124 is provided. The sprockets 122 and 126 are used to drive components of the juicing mechanism 100 so that the movements are synchronized to occur during a specific time in the juicing cycle. Although sprockets and a drive chain are used as a representative mechanism for driving the components of the juicing mechanism 100 and the extraction assembly 148, the sprockets and chain can be replaced with cams, such as eccentric cams for converting rotatory motion into linear motion.

The second sprocket 122 may be connected to a rotary to linear motion converter via use of a connecting rod 150 and crankshaft 152 to an arm and orifice tube at the lower part of the juicing mechanism 100. The extraction cup 102 and cup beam 128 are similarly connected with a rotary to linear motion converter via, for example, use of a connecting rod 168 connecting the cup beam 128 to a crankshaft 166, and in turn the crankshaft 166 is connected to the sprocket 126, to convert the rotary motion of the third sprocket 126 into linear motion of the cup beam 128 and the extraction cup 102. The upper extraction cup 102 is connected to the cup beam 128 which is guided in its up and down motion by two guide rods 130, 132. In a juicing cycle described herein, there is a period where greater torque force is required of the motor 110, such as when compressing the fruit or vegetable item between the first 102 and second 104 extraction cups, and there is a period where lesser torque force is required, such as immediately after compressing the fruit or vegetable item to the point of compressing the next fruit or vegetable item of a new juicing cycle. The VFD 112 makes it possible to reduce motor speeds during the periods of greater torque force requirements, such as when compressing the fruit of vegetable item, and increasing speed during periods of lesser torque force requirements, such as periods between compressing of the fruit or vegetable item.

In one embodiment, the proximity sensor 134 signals the start of a juicing cycle. In this case, the proximity sensor 134 signals the timer 118 to zero and to start counting an elapsed time after the approximated TDC. The one or more timer(s) 118 can be provided in the electronic panel 142 or in programmable logic controller 116. The one or more timer (s) 118 are comparing the elapsed time to inputted time values of a first time (x) 136 and a second time (y) 138. The first time (x) 136 and the second time (y) 138 are pre-determined values. The first time (x) 136 signifies a time period from approximated TDC to the point in the juicing cycle when greater torque is required, such as when the upper extraction cup 102 is at the point of first starting to compress the fruit or vegetable item. The time (x) 136 is pre-determined from calculations based on the system component dimensions, initial rpm setting of motor 110, or the pre-determined time (x) can be empirically determined.

The second time (y) 138 signifies a time period from approximated TDC to the point in the juicing cycle requiring lesser torque, i.e., the end of the period requiring greater torque, such as after bottoming out of the upper extraction cup 102 and upon beginning its upward movement. The time (y) is pre-determined from calculations based on the system component dimensions, rpm of motor 110, or the pre-determined time (y) can be empirically determined.

After the one or more timer(s) 118 has counted the time (x), the motor 110 is controlled via the VFD to lower the speed, thus, increasing torque for the period of the juicing cycle requiring greater torque. The motor 110 is controlled at the lower speed for the duration of the period of the juicing cycle requiring greater torque force, which is counted by the second time (y) 138 after expiration of time (y) 138. Thus, in one embodiment, time (y) coincides with the sum of time (x) plus the time period of the juicing cycle requiring greater torque. In another embodiment, time (y) can signify the time only of the period of the juicing cycle requiring greater torque, such that time (y) is counted starting after the elapse of time (x) and ends counting at the end of the period requiring greater torque. Speed is given as an example of a manipulated variable, however, other manipulated variables representative of high and low torque can be used to control the motor 110 operation, including torque itself.

After the period of the juicing cycle requiring greater torque, i.e., after the elapse of time (y), the juicing cycle enters the period of requiring lesser torque, such as after bottoming out of the upper extraction cup 102 as it begins its upward movement, to the period before compression of the next fruit or vegetable item. In such period, the requirement of lesser speed is removed from the motor 110 via control through the VFD 112.

Both times (x) 136 and (y) 138 are pre-determined and can be entered through the user interface 140 or preprogrammed by other means. The times (x) and (y) can have values in milliseconds. The value of times (x) and (y) can be different for initial speed settings. The initial speed settings will depend on the specific configuration and application of each juicing machine 101.

Figure 5:
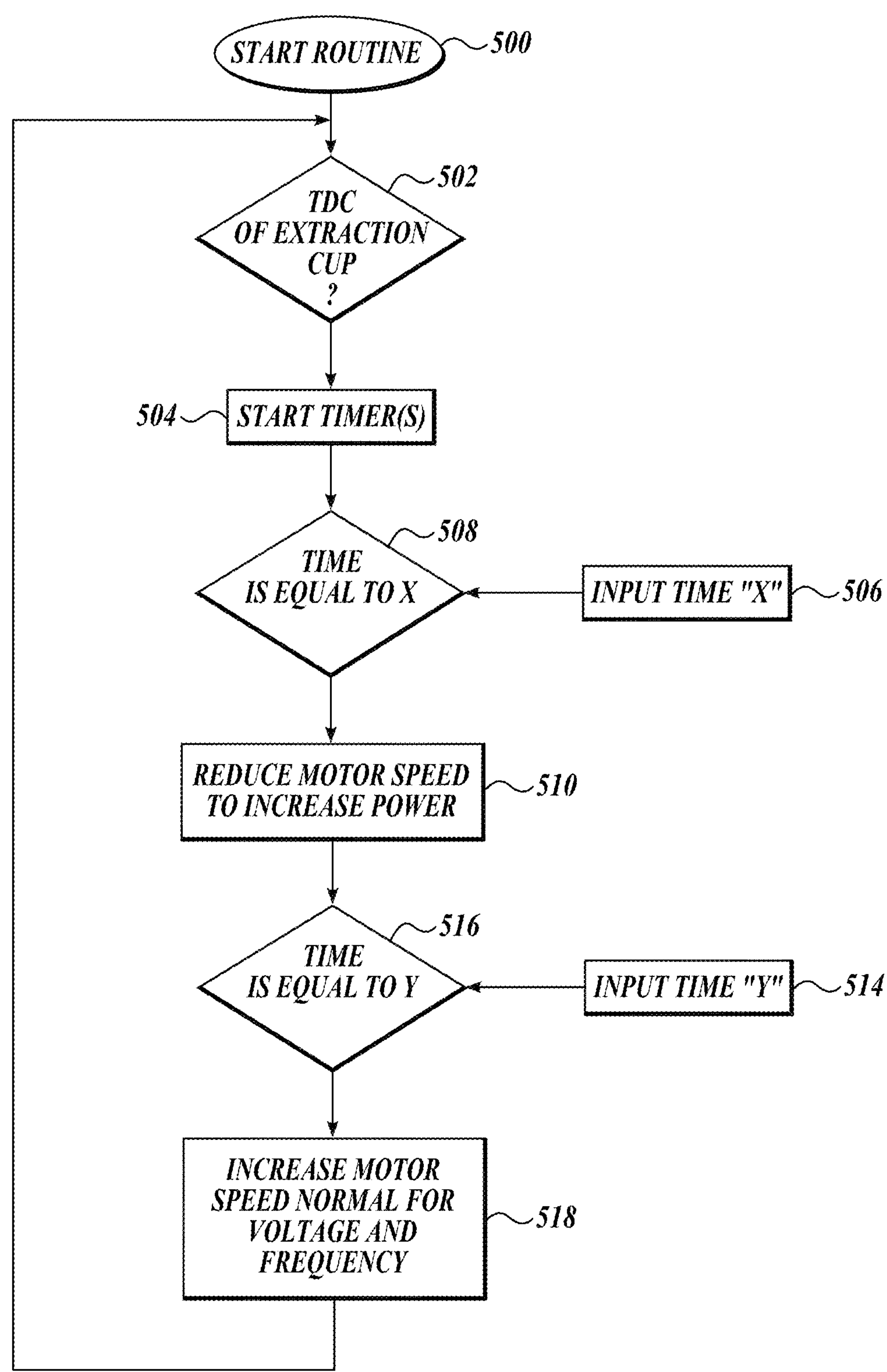
FIG. 5 is a flow diagram of a method for extracting juice.
Figure 6:
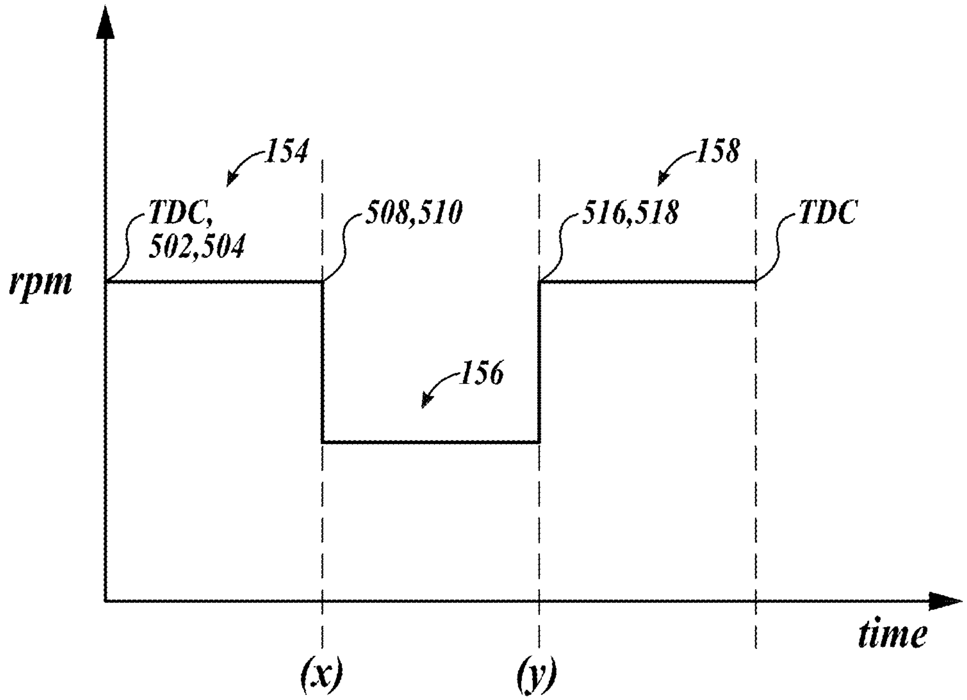
FIG. 6 is a chart illustrating one cycle of the juicing machine.

Referring to FIGS. 5 and 6, a method illustrates the operation of the juicing mechanism 100 of the juicing machine 101. Initially, the VFD 112 is set to increase the speed of the motor 110 above the normal speed expected for the voltage and frequency of the electrical supply 114. FIG. 5 assumes the motor is started running. In one embodiment, the present disclosure relies on a 3-phase motor instead of a single-phase motor for the advantages already mentioned above.

Both single-phase and 3-phase motors are designed to operate at a particular RPM based on the frequency of the incoming electrical service. For countries with 60 Hz electrical frequency (US, Mexico and others), the most common rpm is 1750 or 3600. In one embodiment, the present disclosure uses a 1.5 HP 1750 rpm motor at 60 Hz. For countries with 50 Hz incoming electricity (Europe and others) the most common rpms are 1500 and 3000. The VFD 112 is used at least to 1) convert single-phase to 3-phase and 2) varies the frequency, which in turn varies the speed. For example, at constant motor power of 1.5 HP, the equations can show that the torque is inversely related to the rpm. Slowing down the rpm increases the torque. In one embodiment, if the VFD is set to run initially at 90 Hz (the fastest setting), the speed increases by 50% over the normal operating speed. But the torque decreases at the higher speed.

Although a single-phase motor can be used, a single-phase motor would typically draw more electrical current than is available from standard consumer sockets. Typical current ratings for these sockets are about 10 amps. For example, a single-phase motor draws almost 10 amps while a 3-phase motor would draws only about 2.5 amps up to about 5 amps during the high torque period of the cycle. This represents a minimum 50% reduction in the current draw and allows the use a more powerful (1 HP vs 1.5 HP) motor in the same footprint as a single-phase motor.

Regarding the initial settings of times (x) 136 and (y) 138, the following is provided as one representative example.

The timing functions are related to the speed setting of the machine which can be input by the operator on a small display screen on the user interface 140. In one embodiment, there can be three speed settings.

Fast setting and the motor runs at 90 Hz.

Medium setting and the motor runs at 80 Hz.

Slow setting and the motor runs at 60 Hz at constant speed.

For the fast and medium settings the motor 110 will slow down during the part of the cycle that actually compresses the fruit. For the slow setting, the motor runs at 60 Hz throughout the cycle. The sensor 134 and timer 118 run as follows:

As the cup beam 128 moves up, the sensor 134 will detect the presence of the cup beam 128.

As the cup beam 128 starts to move down, the sensor 134 will detect that the cup beam 128 in no longer within range of the sensor. The loss of signal (falling edge) is the trigger that starts the timer, i.e., the approximated TDC. As the sensor can be placed in any one of numerous locations, the selection of the start trigger is arbitrary, and the time values (x) 136 and (y) 138 are varied according to the placement of the sensor.

Timer values (x) and (y) are based on the initial speed of the machine: fast or medium. Speed does not change when set to the slow speed.

Fast setting (90 Hz, 2625 RPM)

The time value (x) is 50 ms, after which a signal is sent electronically to the VFD to slow down from 90 Hz to 60 Hz.

The time value (y) is 800 ms, after which the slow-down signal is removed and the drive speeds up again to 90 Hz until the next cycle.

Medium setting (80 Hz 2333 RPM)

The time value (x) is 100 ms, after which the motor is slowed down from 80 Hz to 60 Hz The time value (y) is 900 ms, after which the motor is sped up from 60 Hz to 80 Hz The proximity sensor 134 will be located to determine the approximate top-dead-center (TDC) position of the upper extraction cup 102 each time as the juicing mechanism 100 operates in its cyclical manner. When the sensor 134 detects the approximate TDC in block 502, the one or more electronic timer(s) 118 zeros and starts counting elapsed time in block 504. The one or more timer(s) 118 receives the time (x) from inputting block 506.

As the upper extraction cup 102 approaches the fruit to be extracted, the one or more timer(s) 118 is counting down in block 508. When the one or more timer(s) 118 has counted the pre-determined time (x) in block 508, a signal is sent to the VFD 112 to slow down the speed of the motor 110 in block 510 to increase the torque delivered to the juicing mechanism 100. The pre-determined time (x) 136 can be in milliseconds. The time (x) in milliseconds approximately is when the upper cup 102 is about TDC and begins the downward stroke to about the time that the upper cup 102 is about to contact the fruit or vegetable item 160 or makes contact with the fruit or vegetable item 160.

During reduction of the motor speed, the one or more timer(s) 118 continues to count the elapsed time and comparing the elapsed time to find when one or more timer(s) 118 has counted to time (y). The one or more timer(s) 118 receives the time (y) from inputting block 514. When the one or more timer(s) 118 has counted to the pre-determined time (y) in block 516, the signal to reduce the speed is removed from the VFD 112 in block 518, which allows the motor 110 to speed up again to the initial speed settings. The motor 110 does not slow down again until (x) milliseconds after approximated TDC determination by sensor 134. The difference between time (x) and time (y) or the slower speed can correspond to the length of time required to extract the juice, the time of greater torque requirements. For example, the time variable (y) in milliseconds is the sum of time (x) and the time approximately when the upper cup is about to contact the fruit to the time that the upper cup finishes the downward stroke and begins the upward stroke. In another embodiment, time (y) is the time when time (x) has elapsed, and time (y) therefore, corresponds to the time of the period of the greater torque requirement.

FIG. 6 is a graph representing time on the horizontal axis and motor rpm on the vertical axis. At approximate TDC, the motor 110 is at the initial speed setting, and the one or more timer(s) 118 starts to count down, corresponding to steps 502, 504. Then, after elapse of time (x), the motor 110 speed is reduced, the torque is increased, and the one or more timer(s) 118 continues counting elapsed time (without zeroing) to count to time (y), corresponding to steps 508, 510. Then, after the elapse of time (y), the motor 110 speed increases again to the initial speed settings, corresponding to steps 516, 518. Then, the motor 110 is operated at the initial settings until detection of approximate TDC again. The period after time (x) to the elapse of time (y) corresponds to the period 156 of the juicing cycle requiring greater torque, such as during the starting and ending of compression of the fruit or vegetable item. The period 154 of time (x) and the period 158 after time (y) are periods in the juicing cycle not requiring greater torque production (i.e., periods of lower torque), and the motor is set at the initially higher speed settings. Although speed is given as the manipulated variable on the vertical axis, the speed can be replaced with other manipulated or inferred variables, such as frequency, current, voltage, torque, or power.

Figure 7:
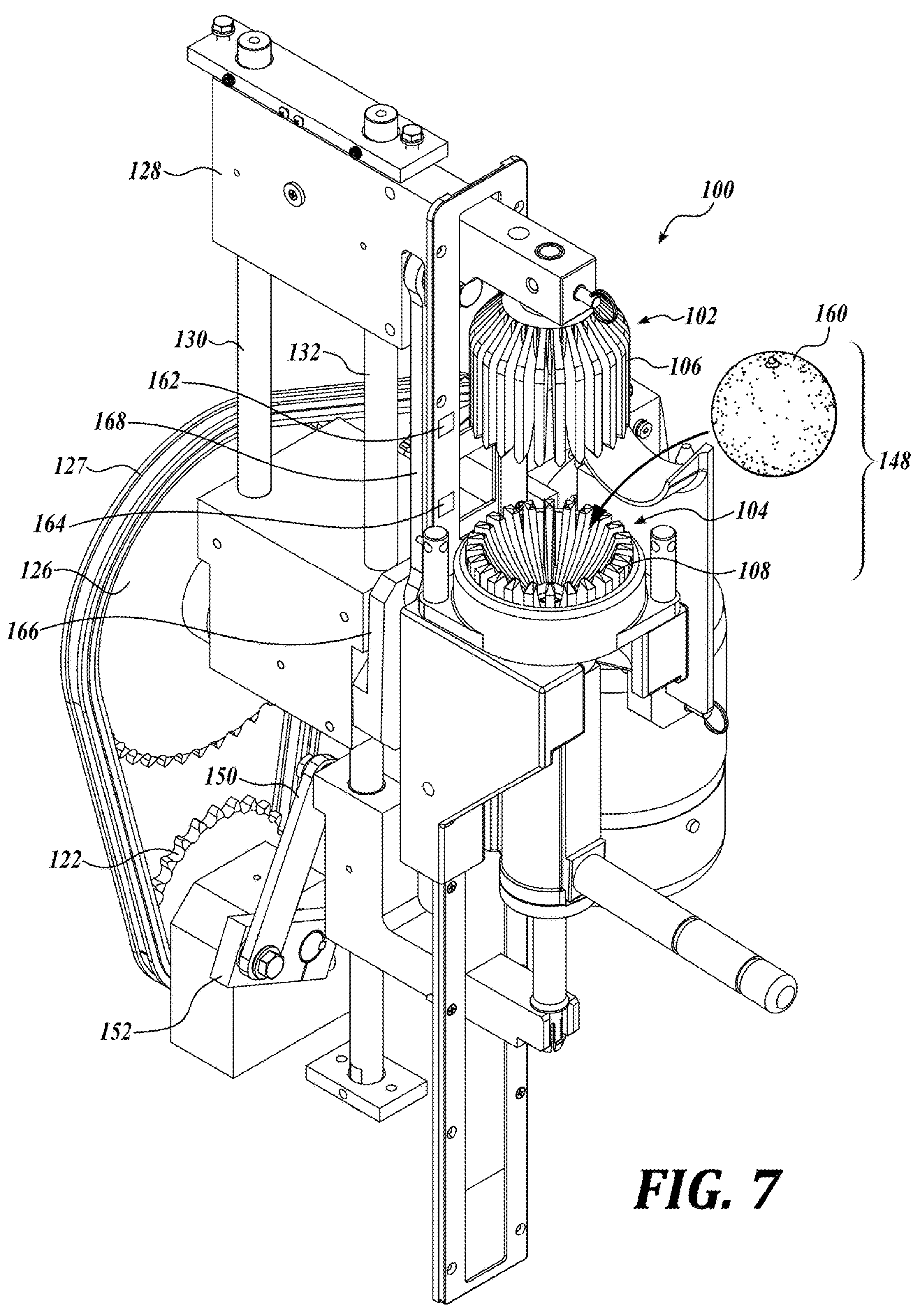
FIG. 7 is a diagrammatical illustration of a second embodiment of the juicing mechanism having sensors to directly sense one or more positions signaling the start and end of the period requiring greater torque.
Figure 8:
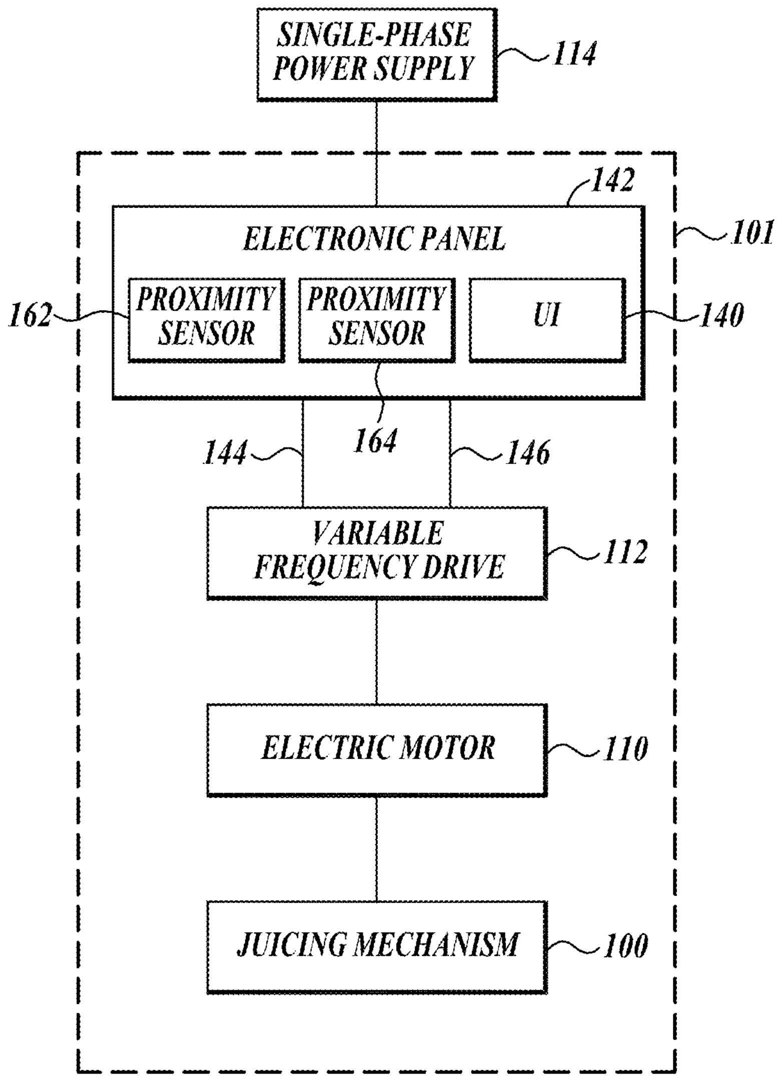
FIG. 8 is a schematic illustration of a second embodiment of the juicing machine.

In another embodiment illustrated in FIGS. 7 and 8, the use of one or more timer(s) 118 or logic controller 116 is not used for timing events or control of the motor 110 speed. In one embodiment, without the one or more timer(s) 118 and logic controller 116, a proximity sensor 162 (or proximity sensors 162, 164) senses the position of the extraction assembly 148, particularly the extraction cup 102, during the high-torque portion of the cycle. For example, the sensor 162 can be placed at a position corresponding to the point at which the extraction cup 102 first makes contact with the fruit or vegetable item 160 as shown in FIG. 7. Upon reaching the sensor 162, a signal is sent to slow down the motor 110. A second sensor 164 could be placed at the lowest point of travel of the extraction cup 102 as shown in FIG. 7, and the signal from the second sensor 164 could be used to increase the speed of the motor 110, and the speed is maintained until the extraction cup 102 is again sensed by the first sensor 162. The period between sensor 162 and 164 is the period of the juicing cycle requiring greater torque from the motor 110. The signal(s) from such sensor(s) 162, 164 at the new locations could then be used to slow down and speed up the VFD directly without the need for timers 118 or control logic. Accordingly, the use of a plurality of sensors, such as proximity sensors 162, 164, provides another embodiment of a method of extracting juice from a fruit or vegetable item 160, which comprises, when sensing 162 a start of a period 156 requiring greater torque for an extraction assembly 148 of a juicing machine 101, reducing speed of an electric motor 110 with a variable frequency drive 112; and when sensing 164 the end of the period 156 requiring greater torque for the extraction assembly 148, increasing the speed of the electric motor 110 with the variable frequency drive 112. In such method, the sensing by sensors 162, 164 is based on the location or height of sensors 162, 164 in proximity to the path taken by the extraction assembly 148 comprising the extraction cup 102 or the cup beam 128 or both the extraction cup 102 and the cup beam 128. In one embodiment, the sensing of the start of the period 156 requiring greater torque for an extraction assembly 148 of the juicing machine 101 is sensed by at least the first sensor 162 placed in proximity to the path taken by the extraction assembly 148, and the sensing of the end of the period 156 requiring greater torque for an extraction assembly 148 of the juicing machine 101 is sensed by at least the second sensor 164 sensor placed in proximity to the path taken by the extraction assembly 148, wherein the first and second sensor are spaced from each other along the path.

In one embodiment, a juicing machine 101 comprises an electric motor 110; a variable frequency drive 112 configured to control the speed of the electric motor; a juicing mechanism 100 that has at least one extraction assembly 148 that operates cyclically to extract juice; and at least one sensor 134 that determines the position or positions of the extraction assembly 148 during a cycle.

In one embodiment, the at least one sensor 134 senses a start of a period 156 of the cycle requiring greater torque to decrease motor 110 speed.

In one embodiment, the at least one sensor 134 determines a start of a juicing cycle, and one or timers 118 count a time (x) 136 from the start of the juicing cycle to a start of a period 156 requiring greater torque, and the one or more timers count a time (y) 138 to an end of the period requiring greater torque.

In one embodiment, the juicing machine 101 comprises a controller 116 that sends a signal to reduce a motor speed from the start of the period requiring greater torque to the end of the period requiring greater torque.

In one embodiment, the juicing machine 101 extracts juice from one item 160 at a time during one cycle of the extraction assembly 148.

In one embodiment, a difference between time (x) 136 and time (y) 138 from the start of the period 156 requiring greater torque to the end of the period requiring greater torque is a period when the extraction assembly 148 is compressing a fruit or vegetable item 160.

In one embodiment, the juicing machine 101 comprises a rotary to linear motion converter 166, 168 that reciprocates the extraction assembly 148 up and down in one cycle.

In one embodiment, the one or more timers 118 start counting when an extraction cup 102 is at an approximated top dead center.

In one embodiment, the juicing machine 101 is configured to be powered from a single phase electrical supply 114.

In one embodiment, the juicing machine 101 comprises a user interface 140 for inputting values of the time (x) and the time (y).

In one embodiment, the juicing mechanism 148 comprises a first extraction cup 102 that reciprocates up and down and a second stationary extraction cup 104, wherein the first extraction cup comprises a plurality of discrete fingers 106 arranged in a ring and the second cup comprises plurality of discrete fingers 108 arranged in a ring, wherein the fingers of the first cup intermesh with the fingers of the second cup.

In one embodiment, the juicing machine 101 comprises one timer 118 that counts time (x) 136 and time (y) 138.

In one embodiment, the electric motor 110 is a 3-phase electric motor.

In one embodiment, a method of extracting juice from a fruit or vegetable item 160, comprises 502 sensing a start of a juicing cycle of a juicing machine 101; 504 counting a first time (x) 136 from the start of the juicing cycle to a start of a period 156 of the juicing cycle requiring greater torque; 508 when the time (x) has been counted to the start of the period requiring greater torque; 510 reducing speed of an electric motor 110 with a variable frequency drive 112; 516 counting a second time (y) 138 to an end of the period requiring greater torque; when the second time (y) has been counted to the end of the period requiring greater torque, 518 increasing the speed of the electric motor with the variable frequency drive.

In one embodiment, 516 counting the second time (y) comprises counting from the start of the juicing cycle to the end of the period 156 requiring greater torque.

In one embodiment, 516 counting the second time (y) 138 comprises starting counting from the time (x) 136 has been counted to the end of the period 156 requiring greater torque.

In one embodiment, the method comprises collecting juice of a fruit or vegetable item 160 and discarding the inedible portions.

In one embodiment, the method comprises, after increasing the speed of the motor 110, 502 sensing a start of a new juicing cycle of the juicing machine 101 with a new fruit or vegetable item 160.

In one embodiment, the juicing machine 101 extracts juice from one fruit or vegetable item 160 at a time during one cycle of a juicing mechanism 148.

In one embodiment, a difference between time (x) 136 and time (y) 138 from the start of the period 156 requiring greater torque to the end of the period requiring greater torque is a period when the extraction assembly 148 is compressing a fruit or vegetable item 160.

In one embodiment, the juicing mechanism 100 comprises a rotary to linear motion converter 166, 168 that reciprocates an extraction cup 102 up and down in one cycle.

In one embodiment, one or more timers 118 start counting when an extraction cup 102 is at an approximated top dead center.

In one embodiment, the method comprises providing the juicing machine 101 with a single phase electrical supply 114.

In one embodiment, the method comprises extracting juice with a first extraction cup 102 that reciprocates up and down and a second stationary extraction cup 104, wherein the first extraction cup comprises a plurality of discrete fingers 106 arranged in a ring and the second cup comprises plurality of discrete fingers 108 arranged in a ring, wherein the fingers of the first cup intermesh with the fingers of the second cup.

In one embodiment, the method comprises loading a fruit or vegetable item 160 in the second cup 104, which is stationary and below the first extraction cup 102.

In one embodiment, the method comprises pre-determining values of the time (x) 136 and the time (y) 138 prior to start of the juicing cycle and inputting the values.

In one embodiment, a method of making a juicing machine 101 comprises replacing a single-phase motor with a 3-phase motor 110 and variable frequency drive 112.

In one embodiment, the method of making further comprises adding one or more timers 118 that count a time (x) 136 from the start of the juicing cycle to a start of a period 156 requiring greater torque, and the one or more timers 118 count a time (y) 138 to an end of the period requiring greater torque.

In one embodiment, a method of extracting juice from a fruit or vegetable item 160, comprises, when sensing 162 a start of a period 156 requiring greater torque for an extraction assembly 148 of a juicing machine 101, reducing speed of an electric motor 110 with a variable frequency drive 112; and when sensing 164 the end of the period 156 requiring greater torque for the extraction assembly 148, increasing the speed of the electric motor 110 with the variable frequency drive 112.

In one embodiment, the sensing by sensors 162, 164 is based on placing sensors 162, 164 in proximity to the path taken by the extraction assembly 148.

In one embodiment, the sensing of the start and end of the period 156 requiring greater torque for the extraction assembly 148 of the juicing machine 101 is sensed by at least a first 162 and second 164 sensor placed in proximity to the path taken by the extraction assembly 148, wherein the first and second sensor are spaced from each other along the path.

While illustrative embodiments have been illustrated and described, it will be appreciated that various changes can be made therein without departing from the spirit and scope of the invention.

The embodiments of the invention in which an exclusive property or privilege is claimed are defined as follows:

1. A juicing machine, comprising:

a 3-phase electric motor;

a variable frequency drive configured to convert a single-phase electrical source to a 3-phase electrical source to drive the motor, the variable frequency drive further configured to control the speed of the electric motor;

a juicing mechanism that operates cyclically to extract juice; and at least one sensor that determines the position or positions of the juicing mechanism during a cycle of the juicing mechanism.

2. The juicing machine of claim 1, wherein the juicing mechanism comprises a first extraction cup that reciprocates up and down and a second stationary extraction cup, wherein the first extraction cup comprises a plurality of discrete fingers arranged in a ring and the second cup comprises plurality of discrete fingers arranged in a ring, wherein the fingers of the first cup intermesh with the fingers of the second cup.

3. The juicing machine of claim 2, comprising a rotary to linear motion converter that reciprocates the first extraction cup up and down during each cycle of the juicing mechanism.

4. The method of claim 1, wherein the juicing machine is connected to a single phase electrical supply.

5. The juicing machine of claim 1, further comprising a controller configured to perform steps, comprising:

sensing a start of a juicing cycle of the juicing machine;

counting a first time from the start of the juicing cycle to a start of a period of the juicing cycle requiring greater torque;

when the first time has been counted to the start of the period requiring greater torque, reducing speed of the electric motor;

counting a second time to an end of the period requiring greater torque;

when the second time has been counted to the end of the period requiring greater torque, increasing the speed of the electric motor.

6. The method of claim 4, wherein counting the second time comprises counting from the start of the juicing cycle to the end of the period requiring greater torque.

7. The method of claim 4, wherein counting the second time comprises starting counting from when the first time has been counted to the end of the period requiring greater torque.

8. The method of claim 4, comprising, after increasing the speed of the motor, sensing a start of a new juicing cycle of the juicing machine.

9. The method of claim 4, wherein the juicing machine extracts juice from one fruit or vegetable item at a time during one cycle of a juicing mechanism.

10. The method of claim 4, wherein a difference between the first time and the second time corresponds to a length of time required to extract juice from a fruit or vegetable.

11. The method of claim 4, comprising pre-determining values of the first time and the second time prior to start of the juicing cycle and inputting the values to the controller via a user interface.

12. A method of making a juicing machine, comprising replacing a single-phase motor with a 3-phase motor and variable frequency drive.

13. The method of claim 12, further comprising adding one or more timers that count a first time from the start of the juicing cycle to a start of a period requiring greater torque, and the one or more timers count a second time to an end of the period requiring greater torque.

* * * * *